June 24, 1958  J. E. WOODS ET AL  2,839,926
CONTROL DEVICE
Filed March 7, 1956
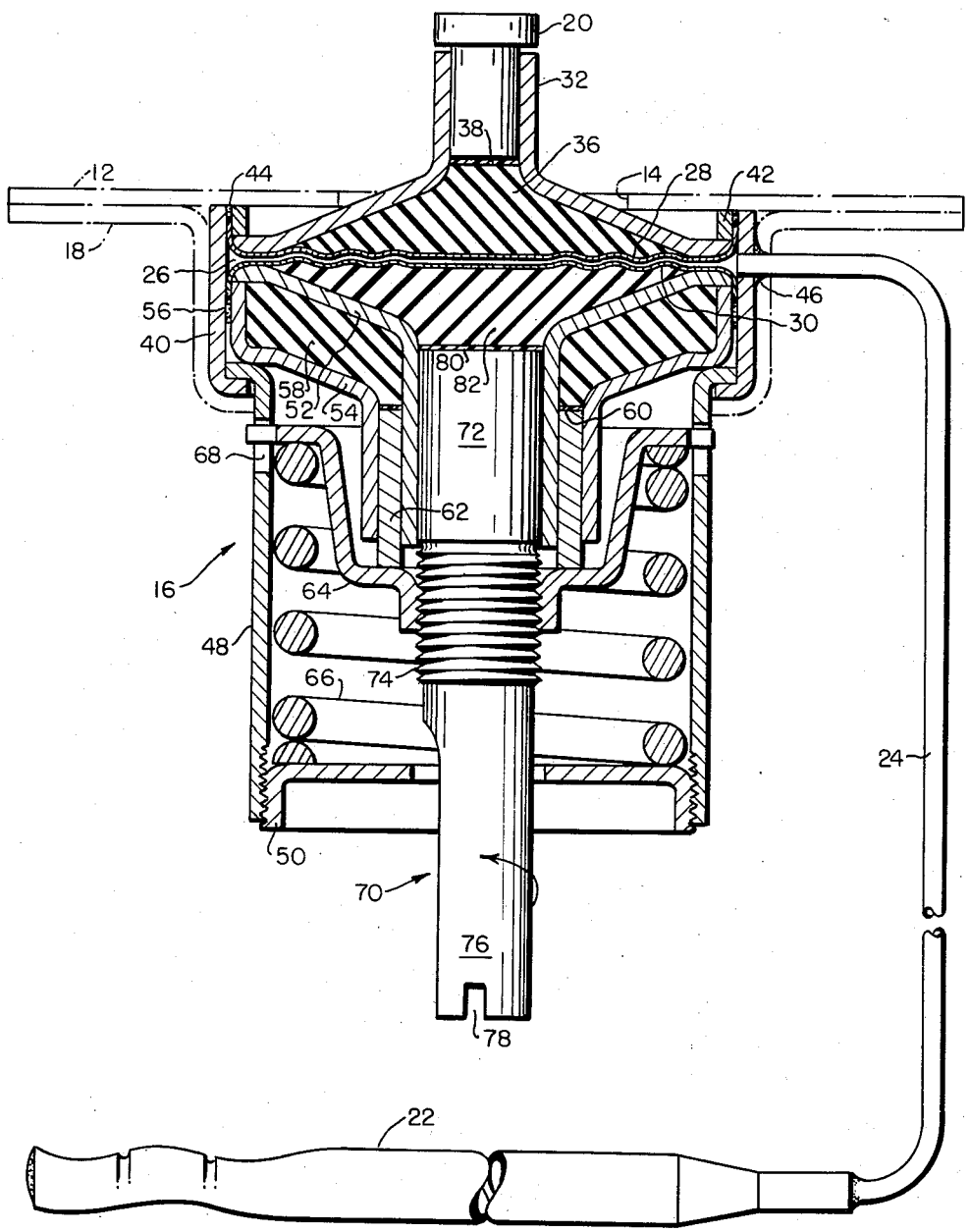
INVENTORS
JOHN E. WOODS
RAYMOND G. GILES
BY
ATTORNEYS United States Patent Office 2,839,926
Patented June 24, 1958

2,839,926

CONTROL DEVICE

John E. Woods, Cohasset, and Raymond G. Giles, Cochituate, Mass., assignors to Standard-Thomson Corporation, Waltham, Mass., a corporation of Delaware Application March 7, 1956, Serial No. 570,148

6 Claims. (Cl. 73—368.4)

The present invention relates to control devices for converting pressure energy to mechanical displacement. The pressure may be generated, for example, by a thermostatic liquid. In particular, the invention is concerned with an improved device adapted for use as a thermostatic control with means for adjustment over a wide temperature range.

The invention is related to, and represents an improvement over, the actuator described in the copending application of Woods, Serial No. 420,120, filed March 31, 1954. In said application the basic structure of this general type of actuator is disclosed, including an outer shell with an actuator pin of small diameter slidable therein, a flexible metal diaphragm to close the shell, a body of rubber or similar elastomeric material filling the space in the shell between the diaphragm and pin, and pressure transmitting means in the form of a liquid to apply pressure to the diaphragm, deforming the elastomer and thereby moving the pin.

The foregoing application also discloses adjustment means in the form of a second structure similar to that just described, remotely situated with respect to the actuator assembly and connected with it by means of a capillary tube.

In the copending application of Woods, Serial No. 477,528, filed December 24, 1954, there is disclosed in Fig. 4 a variation of the actuator in which adjustment means, together with overtravel and ambient compensation means, are incorporated in the body of the actuator itself. However, in cases where temperature adjustment over a considerable range is necessary, as for example in an oven thermostatic control with a range from approximately 100° F. to 550° F., it is found that close control is impeded to some extent by the fact that temperature adjustments directly influence the extent to which the actuator pin extends into the elastomeric body which propels it, and this undesired result is accentuated due to the great sensitivity of the device to temperature change. It is apparent that the retarding force exerted by the elastomer on the pin is a function of the extent to which the pin extends into it, and this tends to decrease the sensitivity somewhat. But in any event, variations in sensitivity with the temperature setting are undesirable. Moreover, in addition to decreasing the sensitivity of the device, the retarding drag on the actuator pin exerted by the elastomer produces so-called "hysteresis," this term being distinguished from magnetic hysteresis and having reference to the following phenomenon. If one should plot the pin displacement against temperature as the temperature is varied from a predetermined value upwards to a higher value and then back down to the original value, one finds that "hysteresis" results in the pin reaching two different positions for the same temperature, one for the case of rising temperature and another for the case of falling temperature. This is ordinarily undesirable. Ideally, the response at a given temperature value in terms of pin displacement should be the same or nearly the same whether the temperature is rising or falling through that value.

It is an important object of the present invention to provide an actuator which, without sacrificing any sensitivity to temperature change, does not produce a variable drag on the actuator pin and hence a "hysteresis" characteristic which is affected by the temperature adjustment, even though said adjustment may be effected over a very wide range of temperatures such as that mentioned above.

Another object of the invention is to provide an actuator assembly of compact construction including overtravel as well as adjustment means.

A further object is to provide an actuator characterized as above, and also including means for compensating for ambient conditions at the actuator. It will be appreciated that ordinarily the actuator itself is remote from the space where the thermostatic bulb is located, and hence ambient conditions at the actuator itself preferably do not influence the operation of the thermostatic control.

With the foregoing and other objects in view, the features of the invention reside in a double diaphragm assembly having an actuator pin and a piston-like member coaxially mounted with the pin and disposed in opposing relationship thereto. The pressure transmitting fluid is admitted to the space between the diaphragms, and urges the pin and piston-like member in opposing directions.

According to another feature, the piston-like member functions to provide adjustment and overtravel means, whereby the opposing actuator pin does not protrude a greater distance into the elastomeric body which propels it for one temperature adjustment than for another.

A further feature resides in the incorporation into the above assembly of an ambient compensator body to minimize or substantially eliminate the effect of ambient conditions on the two elastomeric bodies which propel the pin and piston-like member and, if desired, on the pressure transmitting liquid contained between the diaphragms in the body of the actuator.

Other features of the invention reside in certain details of construction and assembly which will become evident from the following description of a preferred embodiment thereof, and from the appended drawing illustrating the same.

The drawing illustrates what is now considered to be the preferred form of the invention as applied to a thermostatic oven control.

The drawing is a sectional elevation through the axis of the control, the parts of which are all substantially shaped like the surfaces of revolution of the lines in the drawing about the principal axis thereof. The dot and dash lines 12 represent a switch case having a circular hole 14 therethrough. The actuator is adapted to be assembled over and through this hole, being held in the assembled position by means of a mounting plate 18 screwed or bolted to the wall 12. An actuator pin 20 having an end portion of enlarged diameter is thus presented inside the hole 14 in position to actuate a suitable microswitch or the like. This microswitch (not shown) may be mounted securely in a fixed position which remains the same for all temperature adjustments, and exerts a small force on the pin of the order of a few pounds opposing its outward motion.

The structure of the actuator may be conveniently described as consisting of two major parts, a thermal unit and a mechanical transducer-amplifier. The thermal unit consists of a thermostatic bulb 22 situated in the oven, a capillary tube 24, the communicating space 26 between a pair of metal diaphragms 28 and 30, and the other parts situated below the diaphragm 30 as viewed in the drawing. The transducer-amplifier consists of the parts shown above the diaphragm 28.

The transducer-amplifier is substantially the same as that described in said application Serial No. 420,120, and consists of a rigid metallic outer shell 32, the pin 20 slidably received in the shell, and a body 36 of deformable material having an appreciable bulk modulus and substantially filling the space between the diaphragm 28 and the pin. The term "bulk modulus" is here used in the recognized sense to mean the ratio of the change in pressure to the fractional change in volume. This offers a measure of its resistance to compression and consequently of its suitability as a means for "transferring" a volumetric displacement between the diaphragm 28 and the pin 20. An example of such a material is rubber or a rubber substitute. While the latter materials also have resiliency or "memory," that is, a tendency to return to the original shape after deformation, such property is not essential, as will be clear from the following description. Between the pin 20 and the body 36 is a thin wafer 38 of "Teflon" (a tetrafluoroethylene polymer) which prevents any tendency of the body 36 to be extruded or "leak" out around the end of the pin 20 when subjected to pressure. It will be understood that the body 36 preferably has relatively little compressibility while being able to deform substantially under the applied pressure.

Motion of the pin 20 is accomplished by the application of pressure in the space 26 between the diaphragms, said pressure urging the diaphragm 28 upwardly and causing a volume displacement of the body 36 at its lower end which is accommodated by a corresponding displacement of the pin 20.

The bulb 22, capillary tube 24 and space 26 are entirely filled with a suitable pressure transmitting liquid, in this case a thermostatic liquid. Moreover, this liquid system is hermetically sealed by fusion of all metallic surfaces by which it is formed. Such fusion may be by welding, soldering, or brazing, according to preference. It is of course essential that prior to filling the system with liquid, it must be thoroughly evacuated by suitable means, such evacuation being carried as far as practicable.

The shell 32 with the diaphragm 28 assembled thereover is received in a cylindrical, inwardly flanged sleeve 40, and a ring 42 is received inside the upwardly turned edges of the diaphragm. The space between the sleeve 40 and the ring 42 is filled with solder or brazing metal as illustrated at 44, the solder or brazing metal fusing the surface of the diaphragm with the inner surface of the sleeve 40. The capillary tube 24 is received through a hole in the sleeve 40 and soldered, welded or brazed to the sleeve as indicated at 46. While the methods of soldering and brazing have been mentioned, the parts may also be welded, if desired. In any case, the method must be such as to produce an hermetic seal for the thermal liquid, by which is meant a continuous enclosure of fused metallic surfaces.

A cylindrical metal body 48 having an outwardly turned flange at its upper end is received inside the sleeve 40. At its lower end the body 48 has inside threads to receive a threaded cap 50. Above the body 48 is situated an inner shell 52 and an outer shell 54, the diaphragm 30 being turned downwardly over the edges of the assembled shells. Solder or brazing metal at 56 fuses the diaphragm 30 to the inner wall of the sleeve 40.

Between the shells 52 and 54 is a body 58 of deformable material having a substantial bulk modulus and preferably of the same formulation as the body 36. The body 58 provides ambient compensation. A ring-shaped wafer 60 similar in construction and function to the wafer 38 is received over a cylindrical portion of the shell 52 between said shell and the shell 54. A cylindrical sleeve 62 is slidably received between the cylindrical portions of the two shells, being urged upwardly by a threaded cup-shaped member 64. A compression spring 66 bears at one end against the cap 50 and at the other end against an outwardly turned flange on the member 64. This flange also extends at one or more places through openings 68 in the body 48 to prevent the member 64 from rotating inside the member 48.

An adjustment shaft 70 is provided with a piston-like portion 72, a threaded portion 74 and an outwardly projecting end portion 76 provided with a slot 78 for screw driver adjustment. The portion 74 is threaded into the cup-shaped member 64 and the piston-like portion 72 extends into the shell 52. A wafer 80 similar to the wafers 38 and 60 is interposed between the portion 72 and a body 82 of deformable material preferably of the same formulation as the bodies 36 and 58.

In operation, assuming steady-state ambient conditions and a temperature varying from an initial value in the normal range of operation of the device, the diaphragm 30 of the thermal unit remains stationary while the temperature sensed by the bulb 22 varies. An increase in the temperature causes an increase in the amount of thermal liquid between the diaphragms, and since the diaphragm 30 remains stationary, the diaphragm 28 is deflected upwardly, causing outward movement of the pin 20.

The stable position of the diaphragm 30 assumed above results from a balance of forces on the shaft 70. A downward force is exerted upon the face of the piston-like portion 72 by the pressure in the body 82, this pressure being substantially equal to the pressure in the space 26 filled with thermal liquid. An equal upward force is exerted upon the threaded portion 74 of the shaft by the cup-shaped member 64. Considering now the forces acting upon the cup-shaped member 64, this member is urged upwardly by the compression spring 66, and downwardly by both the sleeve 62 and the shaft 72. The position of the sleeve 62 is determined by the volume of the body 58 under the assumed ambient conditions. The spring 66 is strong enough to force the sleeve 62 firmly into contact with the body 58.

Assuming next that the body 58 maintains the given volume while the temperature of the thermal bulb 22 is increased, the pressure in the thermal liquid increases and causes the load on the sleeve 62 to be gradually transferred to the piston 72. A slight increase in the volume of the body 58 due to the reduction in pressure exerted by the sleeve 62 also occurs, but this effect is relatively small. Eventually, at a certain pressure the force exerted upon the face of the portion 72 equals the force exerted by the spring 66. Any further increase in thermal liquid pressure causes compression of the spring 66, and results in movement of the piston 72 downwardly, this latter motion tending to suppress outward motion of the pin 20. In this way overtravel protection is provided. Pressures sufficient to cause such overtravel compression of the spring 66 are produced either by excessive temperature at the bulb 22 or by the fact that the pin 20 reaches an external limiting abutment (not shown).

Ambient compensation, that is, compensation against changes in conditions at the actuator as opposed to conditions at the thermal bulb 22, is provided by expansion or contraction of the volume of the body 58, this body being subjected to substantially the same ambient conditions as the bodies 36 and 82. For example, if the body 58 should expand due to a change in ambient conditions it urges the sleeve 62 downwardly, causing an equal movement downwardly of the shaft 70. This latter movement tends to offset the expansion of the bodies 36 and 82 and the thermal liquid between the diaphragms to reduce or preferably eliminate entirely any responsive motion of the pin 20.

An important feature of the invention resides in the adjustment means whereby rotation of the shaft 70 is used to set the thermostatic device at any control point within a substantial temperature range. In this respect, the structure is to be contrasted with that described in the copending application of Baker, Serial No. 539,793, filed October 11, 1955. In that application, as in the present one, the stated object is to provide for a considerable range of temperature adjustment, whereby the actuator pin projects a constant distance into the actuating elastomeric body regardless of the temperature adjustment. However, a wholly different structure is disclosed for accomplishing this purpose, namely a switch which functions by the displacement between the actuator pin and the overtravel, adjustment and compensator sleeve, both of which are movable. In contrast, the pin 20 in the present application moves relatively to the fixed housing of the control unit to accomplish the desired output.

Temperature adjustment may be explained by an example. If it is desired to set the thermostatic control for a higher temperature than that corresponding to the position of the parts illustrated in the drawing, the shaft 70 is rotated in the direction indicated by the arrow whereby the piston-like portion 72 is moved downwardly. This creates additional space within the shell 52 but results in no substantial change in the volume of the space 26 between the diaphragms. The diaphragms deflect downwardly together under the force exerted through the body 36 by the pin 20 until the flange on the pin comes to rest on the top of the shell 32. After this, further downward movement creates a void between the piston-like portion 72 and the body 82. Consequently, a corresponding increase in the temperature of the thermal liquid system is made necessary by the adjustment to expand the space 26 to fill this void and to develop the pressure needed to move the pin before operation of the control can be accomplished.

It will be seen from the foregoing description that the extent of the temperature adjustment does not change the area of contact between the pin 20 and the body 36, since in any event the pin comes to rest against the shell 32 as previously indicated. However, the temperature level at which the pin may be moved upward from this position of rest through a specified distance of, say, .010 inch to actuate a microswitch or the like is variable depending upon the volume of the void created by the temperature adjustment. Hence, the influence of variable retardation of the elastomer of the pin, such as may be found in the devices of said applications Serial Nos. 420,120 and 477,528, is avoided, and the so-called "hysteresis" characteristic is greatly reduced.

It will be appreciated from the foregoing description that we have provided a compact, adjustable thermostatic device having several important operational characteristics including overtravel protection and ambient compensation. These results are accomplished through suitable motion imparted to a pin 20 that moves in relation to the fixed supporting structure to actuate a suitable external responsive device, as in a thermostatic control.

It will be further appreciated, that while the invention has been described with reference to a preferred embodiment, this has been done for purposes of illustration; and such variations in design and structure as will occur to one skilled in the art upon a reading of the foregoing specification are within the spirit and scope of the invention.

Having thus described the invention, we claim:

1. An actuator having, in combination, a rigid housing, a pair of flexible metal diaphragms supported in the housing to divide the space therein, an hermetically sealed metallic system including the space between the diaphragms and a portion remote from the housing, said system being entirely filled with a pressure transmitting liquid, the housing having a pair of coaxial sleeve bearings separated by both diaphragms, an actuator pin in one of the bearings, a piston-like member in the other bearing having provision for movement in relation to said housing, and a pair of deformable bodies each having an appreciable bulk modulus substantially filling the balance of the divided spaces within the housing.

2. An actuator having, a combination, a rigid housing, a pair of flexible metal diaphragms supported in the housing in position to define a space between them and two isolated spaces in the housing, an hermetically sealed metallic system including the space between the diaphragms and a portion remote from the housing, said system being entirely filled with a pressure transmitting liquid, the housing having a sleeve bearing communicating with each of said isolated spaces, an actuator pin in one of the bearings, a piston-like member in the other bearing having provision for movement in relation to said housing, and a pair of deformable bodies each having an appreciable bulk modulus substantially filling the balance of the divided spaces within the housing.

3. An actuator having, in combination, a rigid housing, a pair of flexible metal diaphragms supported in the housing to divide the space therein, an hermetically sealed metallic system including the space between the diaphragms and a portion remote from the housing, said system being entirely filled with a pressure transmitting liquid, the housing having a pair of sleeve bearings separated by both diaphragms, an actuator pin in one of the bearings, a piston-like member in the other bearing, a pair of deformable bodies each having an appreciable bulk modulus substantially filling the balance of the divided spaces within the housing, and overtravel means resiliently restraining said piston-like member in a predetermined position in the housing.

4. An actuator having, in combination, a rigid housing, a pair of flexible metal diaphragms supported in the housing to divide the space therein, an hermetically sealed metallic system including the space between the diaphragms and a portion remote from the housing, said system being entirely filled with a pressure transmitting liquid, the housing having a pair of sleeve bearings separated by both diaphragms, an actuator pin in one of the bearings, a piston-like member in the other bearing, a member adjustably threaded on the piston-like member and resiliently supported in the housing, and a pair of deformable bodies each having an appreciable bulk modulus substantially filling the balance of the divided spaces within the housing.

5. An actuator having, in combination, a rigid housing, a pair of flexible metal diaphragms supported in the housing to divide the space therein, an hermetically sealed metallic system including the space between the diaphragms and a portion remote from the housing, said system being entirely filled with a pressure transmitting liquid, the housing having a pair of sleeve bearings separated by both diaphragms, an actuator pin in one of the bearings, a piston-like member in the other bearing, means to urge the piston-like member into the housing, a container external to the housing, a first deformable body having an appreciable bulk modulus housed in the container, said piston-like member having a part engaged therewith in position to enter said container as said piston-like member enters the housing and to abut said first deformable body at variable positions as a function of the volume thereof, and second and third deformable bodies each having an appreciable bulk modulus substantially filling the balance of the divided spaces within the housing.

6. An actuator having, in combination, a rigid housing, a pair of flexible metal diaphragms supported in the housing to divide the space therein, an hermetically sealed metallic system including the space between the diaphragms and a portion remote from the housing, said system being entirely filled with a thermal liquid, the housing having a pair of sleeve bearings separated by both diaphragms, an actuator pin in one of the bearings, a piston-like member in the other bearing, first and second deformable bodies each having an appreciable bulk modulus substantially filling the balance of the divided spaces within the housing, a member adjustably threaded on the piston-like member, a spring engaged with said last-mentioned member and tending to urge the piston-like member into the housing, a container external to the housing, a third deformable body having an appreciable bulk modulus housed in the container, and a member engaged with said adjustably threaded member and received in said container to abut said third deformable body to limit the motion of said piston-like member into the housing at variable positions as a function of the volume of said third deformable body.

References Cited in the file of this patent

UNITED STATES PATENTS

| | | |
|---|---|---|
| 1,719,851 | Raney | July 9, 1929 |
| 1,925,530 | Gotthardt | Sept. 5, 1933 |
| 2,252,946 | Persons | Aug. 19, 1941 |
| 2,453,851 | Miller | Nov. 16, 1948 |

FOREIGN PATENTS

| | | |
|---|---|---|
| 702,868 | France | Jan. 25, 1931 |
| 833,361 | France | July 18, 1938 |